United States Patent
Eller et al.

(10) Patent No.: US 9,248,909 B2
(45) Date of Patent: Feb. 2, 2016

(54) SWASHPLATELESS COAXIAL ROTARY WING AIRCRAFT

(71) Applicant: Sikorsky Aircraft Corporation, Stratford, CT (US)

(72) Inventors: Erez Eller, Oakville, CT (US); Steven D. Weiner, Orange, CT (US); Frederick L. Bourne, Litchfield, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 212 days.

(21) Appl. No.: 13/948,585

(22) Filed: Jul. 23, 2013

(65) Prior Publication Data

US 2015/0028597 A1    Jan. 29, 2015

(51) Int. Cl.
*B64C 27/80* (2006.01)
*B64C 27/10* (2006.01)
*B64C 27/72* (2006.01)
(Continued)

(52) U.S. Cl.
CPC ............... *B64C 27/80* (2013.01); *B64C 27/10* (2013.01); *B64C 27/72* (2013.01); *H02K 57/003* (2013.01); *B64C 27/12* (2013.01); *B64C 27/32* (2013.01); *B64C 2027/7216* (2013.01); *B64C 2027/8236* (2013.01)

(58) Field of Classification Search
CPC ........ B64C 27/12; B64C 27/08; B64C 27/10; B64C 27/58; B64C 27/59; B64C 27/605; B64C 27/615; B64C 27/625; B64C 27/635; B64C 27/64; B64C 27/68; B64C 27/72; B64C 27/7205; B64C 27/7211; B64C 27/7216; B64C 27/7222; B64C 27/7227; B64C 27/7233; B64C 27/7238; B64C 27/7244; B64C 27/725; B64C 27/7255; B64C 27/7261; B64C 27/7266; B64C 27/7272; B64C 27/7277; B64C 27/7283; B64C 27/7288; B64C 27/7294; B64C 27/80
See application file for complete search history.

(56) References Cited

U.S. PATENT DOCUMENTS 3,997,131 A * 12/1976 Kling ......................... 244/23 R
4,379,678 A *  4/1983 Carlock et al. .................. 416/98
(Continued)

FOREIGN PATENT DOCUMENTS

EP        0342791        11/1989
EP        0342791 A2     11/1989
(Continued)

OTHER PUBLICATIONS

EP Search Report, Issued Dec. 18, 2014 U330085EP.
(Continued)

*Primary Examiner* — Tien Dinh
*Assistant Examiner* — Alexander V Giczy
(74) *Attorney, Agent, or Firm* — Cantor Colburn LLP

(57) ABSTRACT

A main rotor system of an aircraft is provided including a first rotor coupled to a transmission and configured to rotate about an axis in a first direction. A second rotor is similarly coupled to the transmission and is configured to rotate about the axis in a second direction. At least the first rotor includes an individual blade control system (IBCS) configured to adjust a pitch of each of a plurality of blade of the first rotor independently. A standpipe is fixedly attached to the aircraft. The standpipe is arranged such that the first rotor and the second rotor rotate relative to the standpipe. At least one slip ring is configured to transmit electrical power and/or a control signal to the at least one IBCS.

23 Claims, 11 Drawing Sheets

(51) Int. Cl.
*H02K 99/00* (2014.01)
*B64C 27/12* (2006.01)
*B64C 27/32* (2006.01)
*B64C 27/82* (2006.01)

(56) References Cited

U.S. PATENT DOCUMENTS

| | | | |
|---|---|---|---|
| 4,445,421 A * | 5/1984 | Walker et al. | 91/186 |
| 4,519,743 A | 5/1985 | Ham | |
| 4,930,988 A * | 6/1990 | Griffith | 416/114 |
| 5,799,901 A * | 9/1998 | Osder | 244/17.13 |
| D524,230 S | 7/2006 | Stille et al. | |
| 7,210,651 B2 | 5/2007 | Scott | |
| 7,249,732 B2 | 7/2007 | Sanders, Jr. et al. | |
| 7,604,198 B2 | 10/2009 | Petersen | |
| 7,648,338 B1 | 1/2010 | Welsh | |
| 7,674,091 B2 | 3/2010 | Zierten | |
| 7,762,770 B2 | 7/2010 | Sun et al. | |
| 8,197,205 B2 | 6/2012 | Rudley et al. | |
| 8,235,667 B2 | 8/2012 | Waide et al. | |
| 2007/0131820 A1 | 6/2007 | Chaudhry et al. | |
| 2009/0269199 A1 | 10/2009 | Rudley et al. | |
| 2010/0003133 A1 * | 1/2010 | Welsh | 416/1 |
| 2011/0121127 A1 * | 5/2011 | Certain | 244/17.19 |
| 2012/0181379 A1 | 7/2012 | Eller et al. | |

FOREIGN PATENT DOCUMENTS

| | | |
|---|---|---|
| FR | 995459 | 12/1951 |
| FR | 995459 A | 12/1951 |
| GB | 871267 A | 6/1961 |
| GB | 2090214 | 7/1982 |
| GB | 2090214 A | 7/1982 |
| GB | 2149372 | 6/1985 |
| GB | 2149372 A | 6/1985 |
| GB | 871267 | 6/1991 |
| GB | 2280412 | 2/1995 |
| GB | 2280412 A | 2/1995 |
| GB | 2387157 | 10/2003 |
| GB | 2387157 A | 10/2003 |

OTHER PUBLICATIONS

European Search Report for application EP14177865, dated Dec. 18, 2014, 9 pages.

* cited by examiner

SWASHPLATELESS COAXIAL ROTARY WING AIRCRAFT

BACKGROUND OF THE INVENTION

Exemplary embodiments of the invention generally relate to rotary wing aircrafts, and more particularly, to a control system for pitching the blades of a rotor on a rotary wing aircraft.

Control of a rotary wing aircraft is affected by varying the pitch of the rotor blades individually as the rotor rotates and by varying the pitch of all of the blades together. These are known respectively as cyclic and collective pitch control. Blade pitch control of a rotary wing aircraft main rotor is commonly achieved through a swashplate.

The swashplate is typically concentrically mounted about the rotor shaft. The swashplate generally includes two rings connected by a series of bearings with one ring connected to the airframe (stationary swashplate). The rotating ring is connected to the rotor hub through a pivoted link device typically referred to as "scissors", with the static ring similarly connected to the airframe. The rotating swashplate rotates relative the stationary swashplate. Apart from rotary motion, the stationary and rotating swashplate otherwise move as a unitary component. Cyclic control is achieved by tilting the swashplate relative to a rotor shaft and collective control is achieved by translating the swashplate along the rotor shaft.

Pitch control rods mounted between the main rotor blades and the rotating swashplate transfer loads between the swashplate and the main rotor blades. Main rotor servos extend between and attach to the stationary swashplate and the aircraft fuselage. Displacement of the main rotor servos results in displacement of the stationary swashplate. Hence, by actuating selected main rotor servos, collective and cyclic commands are transferred to the rotor head as vertical and/or tilting displacement of the swashplates.

While swashplate systems are well-known in the art, they are large, heavy, complex, and prone to failure. The bearings necessary to transfer motion from the swashplate to the blades need lubrication and therefore may fail. In addition, mechanical and hydraulic systems have higher failure rates and require more maintenance that electrical systems.

BRIEF DESCRIPTION OF THE INVENTION

According to one embodiment of the invention, a main rotor system of an aircraft is provided including a first rotor coupled to a transmission and configured to rotate about an axis in a first direction. A second rotor is similarly coupled to the transmission and is configured to rotate about the axis in a second direction. At least the first rotor includes an individual blade control system (IBCS) configured to adjust a pitch of each of a plurality of blade of the first rotor independently. At least one slip ring is configured to transmit electrical power and/or a control signal to the at least one IBCS.

According to another embodiment of the invention, a rotary wing aircraft is provided including an airframe having one or more engines mounted thereto. A main rotor system includes a first rotor and a second rotor. The first rotor includes a first rotor hub and a plurality of first blades extending outwardly therefrom. The first rotor is coupled to a transmission and is configured to rotate about an axis in a first direction. The second rotor includes a second rotor hub and a plurality of second blades extending outwardly therefrom. The second rotor is similarly coupled to the transmission and is configured to rotate about the axis in a second direction. At least one slip ring is configured to transmit electrical power and/or a control signal to the at least one IBCS. The first rotor includes a first individual blade control system (IBCS) configured to adjust a pitch of each of the plurality of first blades independently and the second rotor includes a second IBCS configured to adjust the pitch of each of the plurality of second blades independently. At least one slip ring is configured to transmit electrical power and/or a control signal to the first IBCS and the second IBCS.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1A:
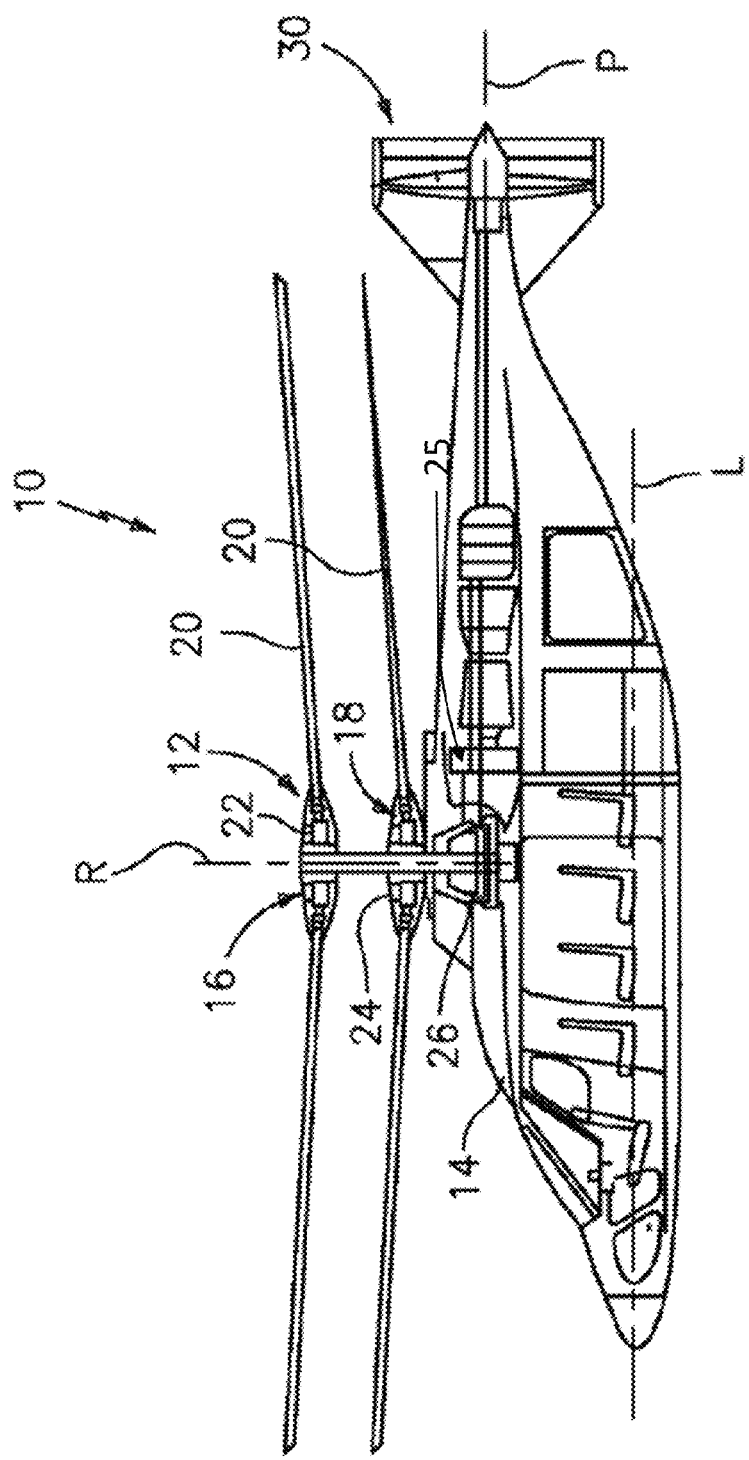
FIGS. 1A and 1B are general views of an exemplary rotary wing aircraft for use with the present invention.
Figure 1B:
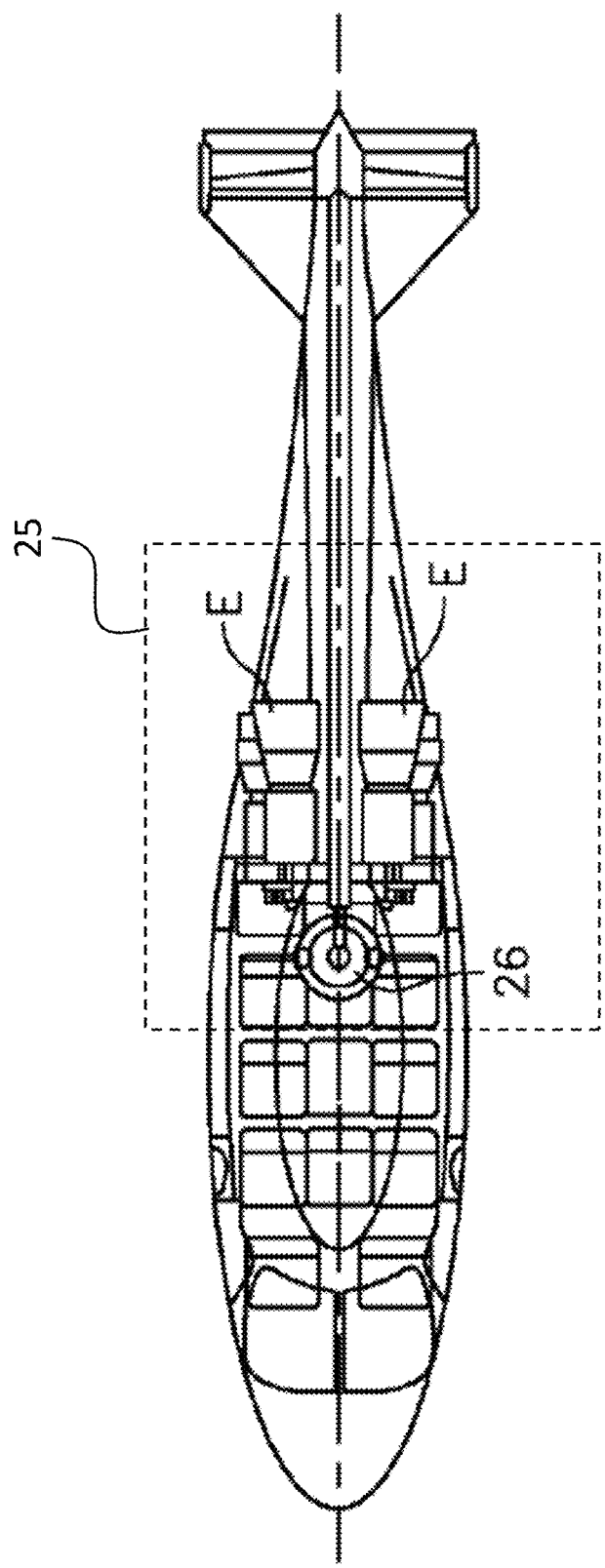

FIGS. 1A and 1B illustrate an exemplary vertical takeoff and landing (VTOL) high speed compound or coaxial contra-rotating rigid rotor aircraft 10 having a dual, contra-rotating main rotor system 12, which rotates about an axis of rotation R. The aircraft includes an airframe 14 which supports the dual, contra-rotating, coaxial main rotor system 12 as well as an optional translational thrust system 30 configured to provide translational thrust generally parallel to an aircraft longitudinal axis L.

The main rotor system 12 includes an upper rotor system 16 and a lower rotor system 18. A plurality of rotor blades assemblies 20 are mounted to a rotor hub 22, 24 of each rotor system 16, 18, respectively. The main rotor system 12 is driven by a transmission 25 illustrated schematically in the FIGS. The translational thrust system 30 may be any propeller system including, but not limited to a pusher propeller, a tractor propeller, a nacelle mounted propeller etc. The illustrated translational thrust system 30 includes a pusher propeller system with a propeller rotational axis P oriented substantially horizontal and parallel to the aircraft longitudinal axis L to provide thrust for high speed flight.

The transmission 25 includes a main gearbox 26 driven by one or more engines, illustrated schematically at E. The main gearbox 26 and engines E are considered as part of the non-rotating frame of the aircraft 10. The translational thrust system 30 may be driven through the main gearbox 26 which also drives the rotor system 12. In the case of a rotary wing aircraft, the gearbox 26 may be interposed between one or more gas turbine engines E, the main rotor system 12 and the translational thrust system 30. In one embodiment, the main gearbox 26 is a split torque gearbox which carries torque from the engines E through a multitude of drivetrain paths. Although a particular rotary wing aircraft configuration is illustrated and described in the disclosed non-limiting embodiment, other configurations and/or machines with rotor systems are within the scope of the present invention.

Figure 2A:
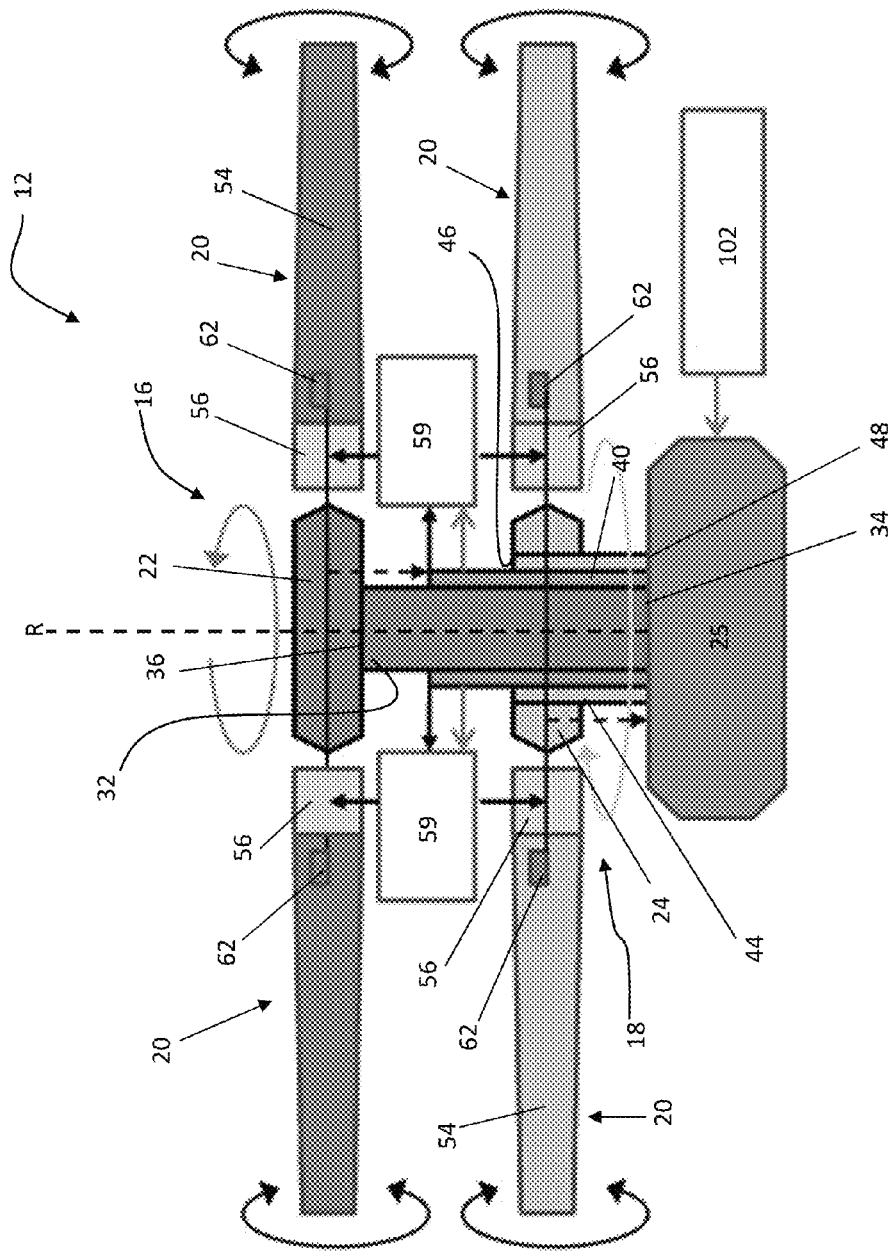
FIGS. 2a, 2b, and 2c are a cross-section of the main rotor system of a rotary wing aircraft according to an embodiment of the invention.
Figure 2B:
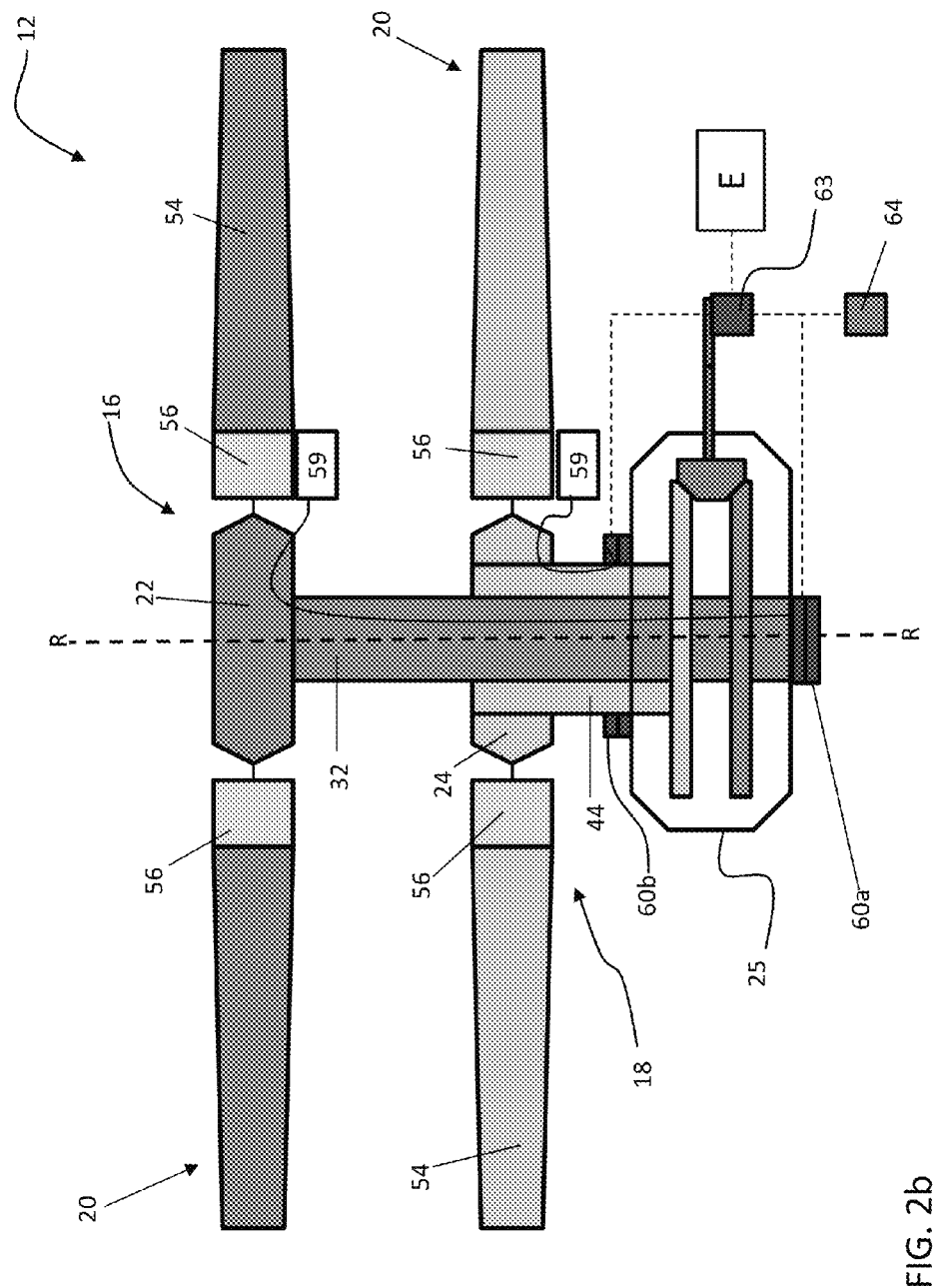
Figure 2C:
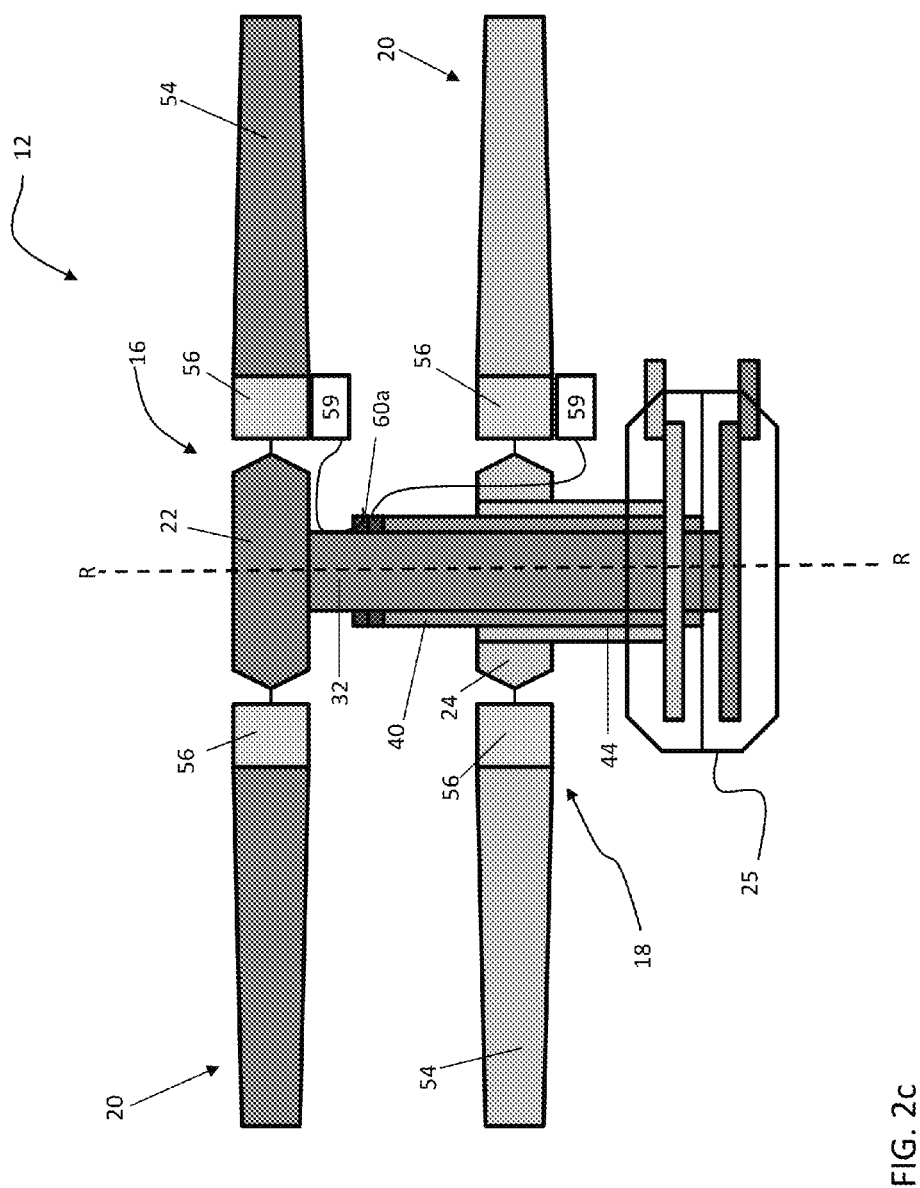

Referring now to FIGS. 2a-2c, the main rotor system 12 is illustrated in more detail. The dual, contra-rotating, coaxial rotor system 12 includes an upper rotor shaft 32 that is coupled to the transmission 25 at a proximal end 34 and is connected to the upper rotor hub 22 at a distal end 36. In one embodiment, a cylindrical standpipe 40 extends from the transmission 25 and is arranged generally concentrically about the upper rotor shaft 32. The standpipe 40 may extend over only a portion of the length of the upper rotor shaft 32, such as beyond the lower rotor hub 24 for example, or alternatively, may extend over the entire length of the rotor shaft 32. The standpipe 40 is rotationally fixed relative to the airframe 14 such that the upper rotor shaft 32 rotates relative to the standpipe 40.

A generally hollow, tubular, lower rotor shaft 44 is coupled to the lower rotor hub 24 at a first end 46 and to the transmission 25 at a second, opposite end 48. The lower rotor shaft 44 may be arranged generally concentrically about the exterior of the standpipe 40 such that the lower rotor shaft 44 is configured to rotate relative to the standpipe 40 in a direction opposite the rotation of the upper rotor shaft 32. In one embodiment, the lower rotor shaft 44 and the upper rotor shaft 32 are coupled, such as through a spline arrangement (not shown) within the transmission 25 for example, such that application of a force to only one of the upper and lower rotor shaft 32, 44 will cause both shafts 32, 44 to counter rotate about axis R. Other known shaft configurations for a contra-rotating coaxial rotor system 12 are within the scope of the invention.

The main rotor system 12 additionally includes one or more slip rings 60 configured to transmit power or electrical signals from a stationary structure to a rotating structure, such as from the non-rotating frame to the rotating frame of the aircraft 10 for example. In one embodiment, as illustrated in FIG. 2b, a first slip ring 60a is positioned at the first end 34 of the upper rotor shaft 32 adjacent the transmission 25, and a second slip ring 60b is arranged at a portion of the lower rotor shaft 44 similarly near the transmission 25. The first slip ring 60a and the second slip ring 60b are operably coupled to the upper and lower rotor systems 16, 18 respectively, such as with a wire for example. Alternatively, in configurations of the main rotor system 12 including a standpipe 40 arranged concentrically between the upper rotor shaft 32 and the lower rotor shaft 44, at least one slip ring 60 may be mounted to the standpipe 40, for example at a position between the upper and lower rotor hubs 22, 24 (see FIG. 2c).

Figure 3:
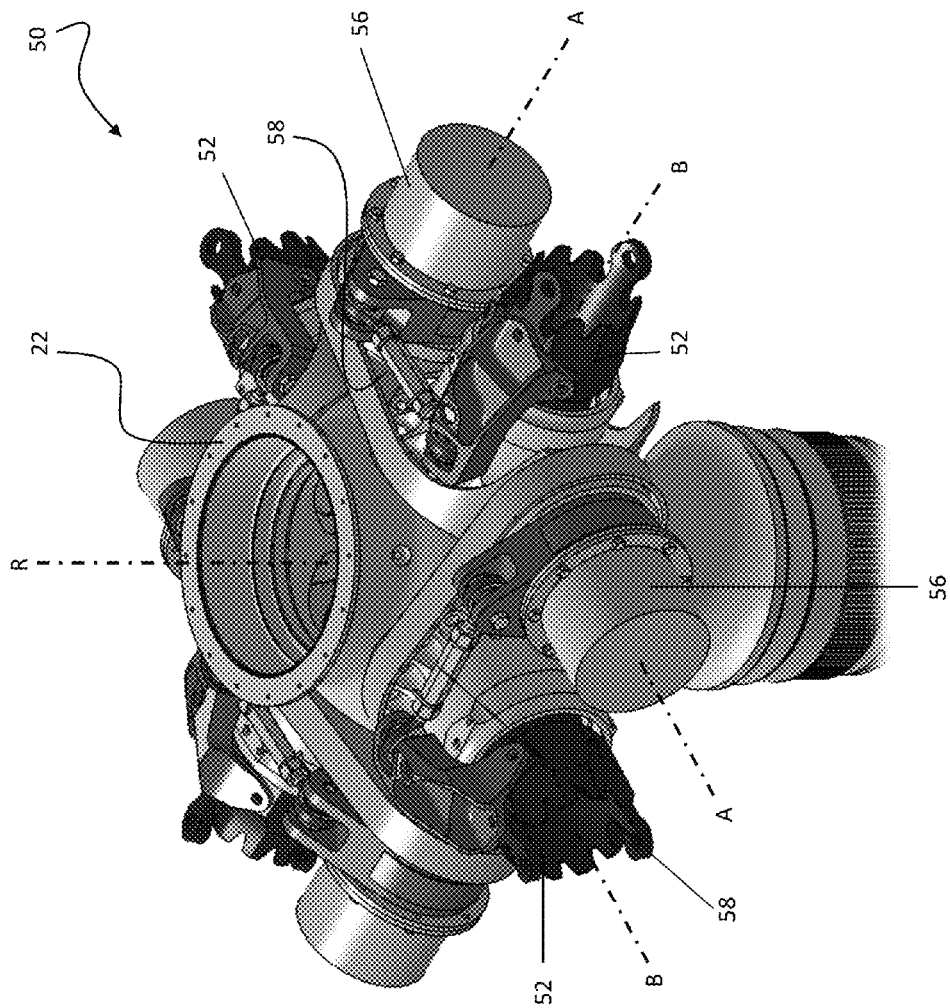
FIG. 3 is a perspective view of an individual blade control system according to an embodiment of the invention.

At least one of the upper rotor system 16 and the lower rotor system 18 includes an individual blade control system (IBCS) 50 for controlling the pitch angle of each blade assembly 20 mounted thereto (see FIG. 3). In one embodiment, both the upper and lower rotor systems 16, 18 include an IBCS 50. Referring now to FIG. 3, an exemplary IBCS 50 is illustrated in more detail. Each of the plurality of blade assemblies 20 includes a blade cuff 52 supporting a rotor blade 54, and mounted either directly or indirectly to a rotor hub, for example hub 22 or 24. Each of the plurality of blade cuffs 52 is configured to rotate about an axis B, to adjust the pitch angle of the blade 54 coupled thereto. The IBCS 50 also includes a plurality of electrical actuators 56, each of which is configured to control the rotation of one of the blade cuffs 52 about axis B. In one embodiment, each of the plurality of electrical actuators 56 includes a motor having a plurality of redundant winding sets, such as three winding sets for example. In the embodiment illustrated in FIG. 3, the electrical actuators 56 are similarly configured to rotate about an axis A, perpendicular to the rotational axis R of the rotor hub 22. The rotational axes B of each of the plurality of blade cuffs 52 and the rotational axes A of each of the plurality of electrical actuators 56 may, but need not be, arranged within the same plane. In the illustrated, non-limiting embodiment, the electrical actuators 56 are arranged such that the axis A of each of the actuators 56 is substantially parallel to the axis B of an adjacent blade cuff 52.

Each electrical actuator 56 is directly or indirectly coupled to an adjacent blade cuff 52 such that rotation of the electrical actuator 56 causes a similar rotation of the blade cuff 52. In the illustrated embodiment, a coupling mechanism 58, such as a push rod or gear train for example, extends between an actuator 56 and an adjacent blade cuff 52. When the actuator 56 rotates in a first direction, the coupling mechanism 58 applies a moment to the blade cuff 52 causing a similar rotation in the first direction. Although a particular IBCS 50 configuration is illustrated and described in the disclosed non-limiting embodiment, other configurations, such as co-linearly arranged actuators 56 and blade cuffs 52, actuators 56 configured to rotate about an axis A generally perpendicularly to the axis of rotation B of the blade cuffs 52, or actuators 56 arranged inside the ends of the rotor blade 54 configured to mount to the blade cuffs 52 for example, are within the scope of the invention.

Figure 4:
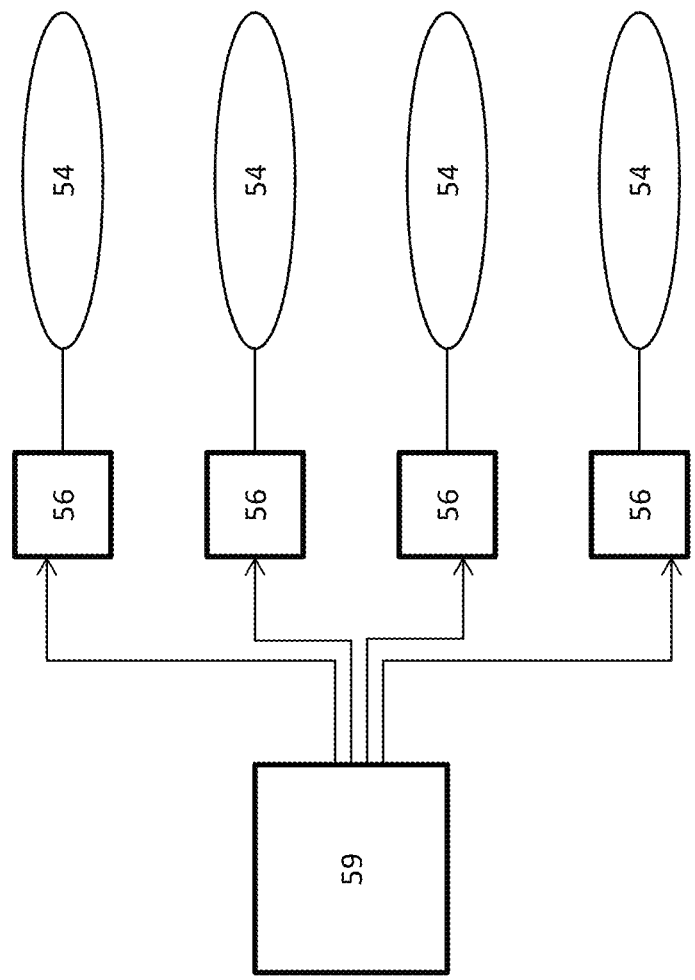
FIGS. 4 and 4a are a schematic illustration of a controller of an individual blade control system according to an embodiment of the invention.
Figure 4A:
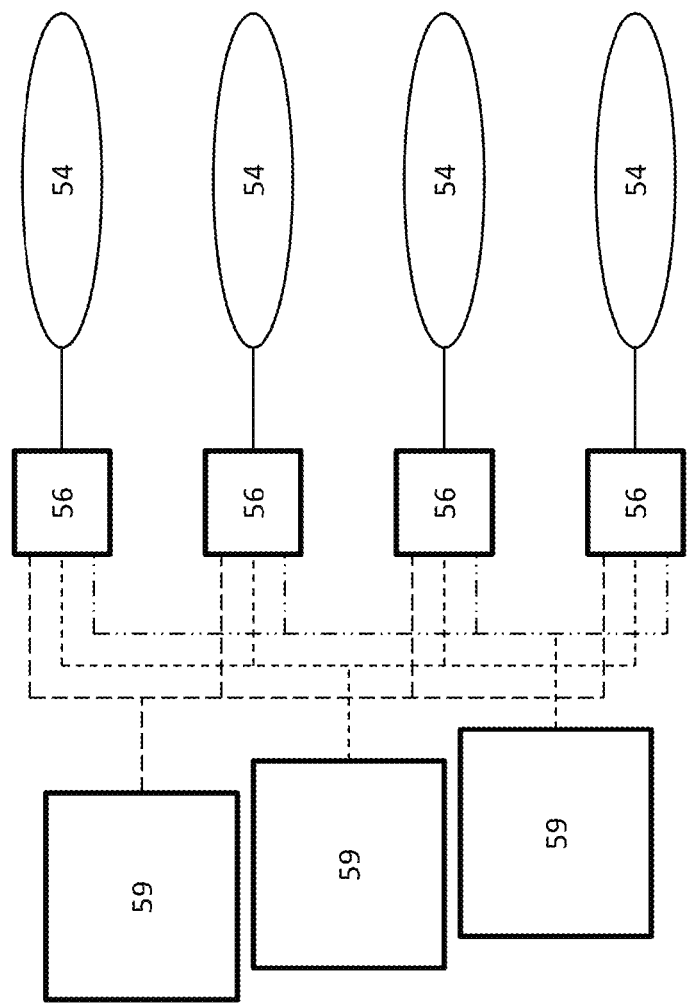

Referring now to FIG. 4, at least one controller 59 is operably coupled to the plurality of electrical actuators 56 of an IBCS 50. In one embodiment, one controller 59 is provided for each winding set of the actuators 56 (FIG. 4a). For example, if each actuator motor 56 includes three sets of redundant windings, the IBCS 50 includes at least three controllers 59. Each additional controller 59 included creates an additional level of redundancy in the IBCS 50. Each controller 59 may include a plurality of channels equal to the number of rotor blades 54, and therefore the number of actuators 56, such that one channel of each controller 59 is connected to each of the actuators 56.

Figure 5:
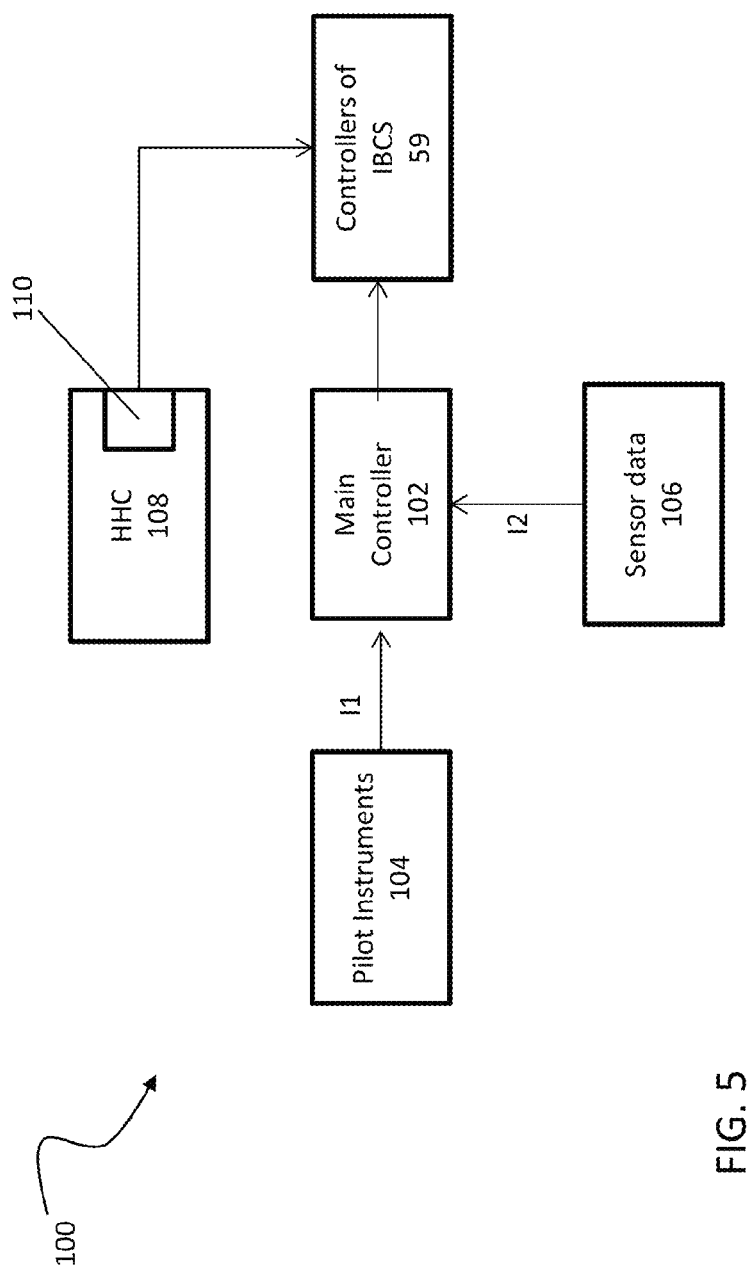
FIG. 5 is a schematic illustration of a control system for adjusting the pitch of at least one rotor blade according to an embodiment of the invention.

As illustrated schematically in FIG. 5, the rotary wing aircraft 10 includes a control system 100, including a main controller 102, which is commonly a computer. The main controller 102 is operably coupled to the plurality of controllers 59 of each IBCS 50 of the aircraft 10. When the pilot of a rotary wing aircraft 10 applies a force to at least one of a plurality of pilot instruments configured to control the flight of the rotary wing aircraft 10, such as inceptors 104 for example, an input signal I1 is provided to the main control 102. In addition, sensor data 106, such as from an Inertial Measurement Unit (IMU) for example, is provided as an input I2 to the main controller 102. A higher harmonic control (HHC) system 108 including accelerometers (not shown) mounted within the airframe 14 is configured to monitor vibratory acceleration. In one embodiment, the HHC 108 may include a separate vibration control computer 110 operably coupled to the plurality of controllers 59. The vibration control computer 110 may be configured to calculate the higher harmonic coefficients per revolution necessary to cancel vibration and may communicate these coefficients directly to each of the controllers 59.

Figure 6:
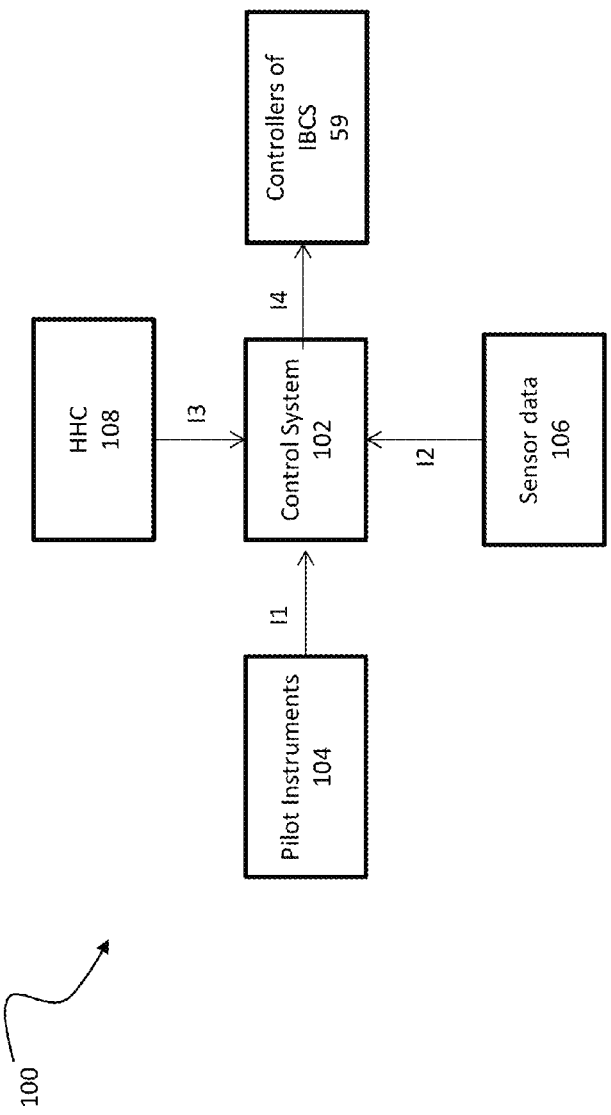
FIG. 6 is a schematic illustration of another control system for adjusting the pitch of at least one rotor blade according to an embodiment of the invention.

In another embodiment, illustrated in FIG. 6, the HHC 108 is operably coupled to the main controller 102. The measured acceleration data, provided as an input I3 to the main controller 102, is used to calculate the higher harmonic coefficients per revolution necessary to cancel vibration. Based on the plurality of inputs I1, I2, I3, the main controller 102 determines independent waveform coefficients for each rotor blade 54. The independent waveform coefficients are transmitted through a plurality of signals I4, to the channels of the controllers 59 to be synthesized. In response to the signals I4, the at least one controller 59 rotates each respective electrical actuator 56 a given amount in either a first or second direction to achieve a desired pitch of the coupled rotor blades 54.

The signals I4 provided by the main controller 102 may be communicated either wirelessly, or through a wired connection, such as through the slip rings 60 (see FIGS. 2a-2c) connected to the controllers 59 through each of the rotor hubs 22, 24 for example. Alternatively, the signals I4 may be transmitted to the controllers 59 optically, using a fiber optic rotary joint for example. In one embodiment, each blade assembly 20 may additionally include a plurality of blade sensors 62 (see FIG. 2a). The blade sensors 62 may be configured to similarly transmit signals, such as blade pitch angles and flatwise bending for example, which may be provided as feedback to the control system 100 of the aircraft 10.

Referring again to the non-limiting embodiment illustrated in FIG. 2b, electrical power for the actuators 56 and the controllers 59 of the IBCS 50 of both upper and lower rotors 16, 18 is generally provided via the slip rings 60. Power from at least one of the aircraft's engines E is converted to electrical power by a generator 63 before being transmitted to at least one slip ring 60 connected thereto. In one embodiment, a portion of the power from the generator 63 is additionally provided to an energy storage device 64, such as a battery for example. The energy storage device 64, operably coupled to the slip ring 60 and/or the control system 100 is configured to provide emergency backup power in the event of electrical power failure due to engine, generator, or wire failure. In embodiments including a standpipe 40 arranged between the upper rotor shaft 32 and the lower rotor shaft 44 (see FIG. 2c), wires extending from the slip rings(s) 60 to the controllers 59 and/or actuators 56 may be routed through the standpipe 40 and/or the rotor hubs 22, 24. The power and/or data transmitted through one or both slip rings 60 of the main rotor system 12 may include triplex conductance to achieve a desired system redundancy and reliability.

Figure 7:
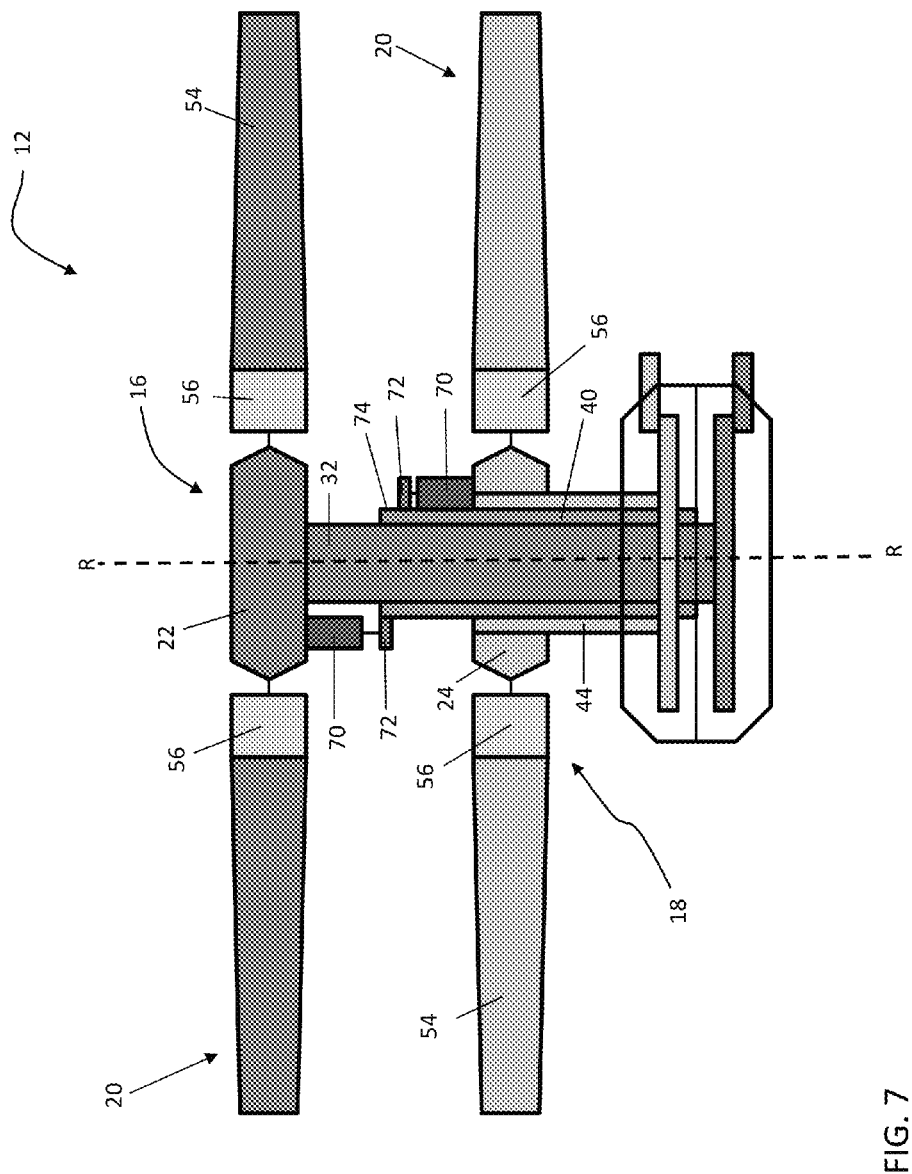
FIG. 7 is a cross-section of the main rotor system of a rotary wing aircraft according to an embodiment of the invention.

Referring now to FIG. 7, the main rotor system 12 may additionally include at least one generator 70 positioned adjacent the fixed standpipe 40. In the illustrated non-limiting embodiment, the generators 70 are mounted to the upper and lower rotor hubs 22, 24 and are configured to generate power during rotation of the upper and lower rotor systems 16, 18 respectively. Though only one generator 70 is illustrated for each of the upper and lower rotor systems 16, 18, any number of generators 70 may be included in each system 16, 18. The generators 70 may be configured to provide power to the energy storage device, or to the controller 59 and/or electrical actuators 56 of the IBCS 50 of either or both rotor systems 16, 18. Each generator 70 includes an engagement mechanism 72, such as a gear for example, extending from the generator 70 for engagement with a portion 74 of the standpipe 40, such as a gear ring, or gear teeth formed on the exterior of the standpipe 40. The engagement mechanisms 72 of the plurality of generators 70 may engage the same portion 74 or gear ring of the standpipe 40, or alternatively, may engage distinct portions 74 or gear rings of the standpipe 40. Because the standpipe 40 is fixed to the airframe 14, rotation of the main rotor system 12 about axis R causes the engagement portion 72 to rotate about portion 74 of the standpipe 40, thereby generating power in generator 70. A variety of other engagement mechanisms 72 are within the scope of the invention. In addition, the orientation of the engagement mechanisms 72 and generators 70 are exemplary only and are not intended to limit the application of generators 70 to the main rotor system 12.

Inclusion of an IBCS 50 in both the upper and lower rotor system 16, 18 eliminates the need for a swashplate for each rotor 16, 18 and therefore reduces the overall height of the dynamic system 12. As a result of this height reduction, it is possible to include a cabin in the aircraft 10. By eliminating components associated with the swashplate and conventional blade pitch control, the weight of the aircraft 10 will be reduced, the aerodynamic and mechanical drag will be reduced, and the efficiency of the aircraft 10 will improve. In addition, transmission of data between the main rotor system 12 and the fixed frame enables other benefits, such as rotor moment feedback for stability improvement, rotor load alleviation, tip clearance feedback, and rotor health and usage monitoring.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A main rotor system of an aircraft comprising:
    a first rotor coupled to a transmission and configured to rotate about a first axis in a first direction;
    a second rotor coupled to the transmission, the second rotor being configured to rotate about the first axis in a second direction, wherein at least the first rotor includes an individual blade control system (IBCS) configured to adjust a pitch of each of a plurality of blades of the first rotor independently;
    a standpipe fixedly attached to the aircraft, the standpipe being arranged such that the first rotor and the second rotor rotate relative to the standpipe; and
    at least one slip ring configured to transmit at least one of electrical power or a control signal to the at least one IBCS.

2. The main rotor system according to claim 1, wherein a first slip ring is connected to the first rotor adjacent the transmission and a second slip ring is connected to the second rotor near the transmission.

3. The main rotor system according to claim 2, wherein the first rotor includes a first IBCS and the second rotor includes a second IBCS.

4. The main rotor system according to claim 3, wherein the first slip ring is configured to transmit at least one of electrical power or a first control signal to the first IBCS and the second slip ring is configured to transmit at least one of electrical power or a second control signal to the second IBCS.

5. The main rotor system according to claim 1, wherein the standpipe is arranged generally concentrically between the first rotor and the second rotor and the at least one slip is ring mounted to the standpipe.

6. The main rotor system according to claim 5, wherein the first rotor includes a first IBCS and the second rotor includes a second IBCS.

7. The main rotor system according to claim 1, wherein the at least one IBCS further comprises:
   a plurality of actuators, each of which is configured to rotate one of the plurality of rotor blades about a pitch axis, the pitch axis being arranged at an angle to the first axis; and
   at least one controller having a plurality of channels, each actuator being operably coupled to one of the plurality of channels such that the at least one controller is configured to operate the actuators in response to a control signal.

8. The main rotor system according to claim 7, wherein the at least one slip ring is configured to transmit at least one of electrical power or the control signal to the at least one controller via one or more wires.

9. The main rotor system according to claim 7, wherein the at least one slip ring is configured to transmit at least one of electrical power or the control signal to the at least one controller wirelessly.

10. The main rotor system according to claim 7, wherein the at least one controller of the IBCS is configured to receive the control signal optically.

11. A rotary wing aircraft comprising:
   an airframe having one or more engines mounted thereto;
   a main rotor system including:
      a first rotor including a first rotor hub and a plurality of first blades extending outwardly therefrom, the first rotor being coupled to a transmission and configured to rotate about an axis in a first direction;
      a second rotor including a second rotor hub and a plurality of second blades extending outwardly therefrom, the second rotor being coupled to the transmission and configured to rotate about the axis in a second direction, wherein the first rotor includes a first individual blade control system (IBCS) configured to adjust a pitch of each of the plurality of first blades independently and the second rotor includes a second IBCS configured to adjust the pitch of each of the plurality of second blades independently;
      a standpipe rotationally fixed relative to the airframe such that the first rotor and the second rotor rotate relative to the standpipe; and
      at least one slip ring configured to transmit at least one of electrical power or a control signal to the first IBCS and the second IBCS.

12. The rotary wing aircraft according to claim 11, wherein power from the engine is converted to electrical energy in a generator before being supplied to the at least one slip ring.

13. The rotary wing aircraft according to claim 12, further comprising an energy storage device configured to receive a portion of the electrical energy converted by the generator, wherein the energy storage device is configured to transmit power to at least one of the first IBCS and the second IBCS.

14. The rotary wing aircraft according to claim 11, wherein a first slip ring is connected to the first rotor adjacent the transmission and a second slip ring is connected to the second rotor near the transmission.

15. The rotary wing aircraft according to claim 12, wherein the first slip ring is configured to transmit at least one of electrical power or a first control signal to the first IBCS and the second slip ring is configured to transmit at least one of electrical power or a second control signal to the second IBCS.

16. The rotary wing aircraft according to claim 11, wherein each of the first IBCS and the second IBCS further comprises:
   a plurality of actuators, each of which is configured to rotate one of the plurality of rotor blades about a pitch axis, the pitch axis being arranged at an angle to the first axis; and
   at least one controller having a plurality of channels, each actuator being operably coupled to one of the plurality of channels such that the at least one controller is configured to operate the actuators in response to a control signal.

17. The rotary wing aircraft according to claim 11, further comprising a control system configured to generate the control signal, the control signal including waveform coefficients.

18. The rotary wing aircraft according to claim 17, wherein the waveform coefficients transmitted to the control system are determined using inceptor data and sensor data.

19. The rotary wing aircraft according to claim 17, wherein the waveform coefficients include a higher harmonic control signal.

20. The rotary wing aircraft according to claim 11, wherein the standpipe is arranged generally concentrically between the first rotor and the second rotor and the at least one slip is ring mounted to the standpipe.

21. The rotary wing aircraft according to claim 20, further comprising:
   a generator mounted to the first rotor, the generator including an engagement mechanism configured to engage a portion of the standpipe such that power is generated by the generator as the first rotor is rotated about the axis.

22. The rotary wing aircraft according to claim 21, further comprising another generator such that a generator is mounted to both the first rotor and the second rotor.

23. The rotary wing aircraft according to claim 22, wherein power generated by the one of the generators is configured to operate the first IBCS, and power generated by another of the generators is configured to operate the second IBCS.

* * * * *